United States Patent [19]

Kato et al.

[11] Patent Number: 4,805,733
[45] Date of Patent: Feb. 21, 1989

[54] ACTIVE SILENCER

[75] Inventors: Masahiko Kato, Nukata; Masanori Katou, Toyoake; Satosi Kuwakado, Nukata; Katsuyuki Tanaka, Nishio; Koji Ito, Anjo, all of Japan

[73] Assignees: Nippondenso Co., Ltd., Kariya; Nippon Soken, Inc., Nishio, both of Japan

[21] Appl. No.: 70,447

[22] Filed: Jul. 7, 1987

[51] Int. Cl.$^4$ ................................................ F01N 1/06
[52] U.S. Cl. ........................................ 181/206; 381/71
[58] Field of Search ...................... 181/206, 207, 227; 381/71

[56] References Cited

U.S. PATENT DOCUMENTS

| | | | |
|---|---|---|---|
| 2,043,416 | 6/1936 | Lueg | 381/71 |
| 3,936,606 | 2/1976 | Wanke | 181/206 X |
| 4,025,724 | 5/1977 | Davidson et al. | 381/71 |
| 4,122,303 | 10/1978 | Chaplin et al. | 381/71 |

FOREIGN PATENT DOCUMENTS

| | | |
|---|---|---|
| 57-006897 | 7/1982 | Japan . |
| 59-073517 | 5/1984 | Japan . |
| 59-133595 | 7/1984 | Japan . |
| 61-247509 | 11/1986 | Japan . |
| 62-020712 | 1/1987 | Japan . |
| 62-020713 | 1/1987 | Japan . |
| 62-048911 | 3/1987 | Japan . |

OTHER PUBLICATIONS

"Phase Locked Loop, Linear Integrated Circuits, SE565 NE565" Signetics Corporation, USA, 1970.
Method of Use of PLL-IC by M. Hata and K. Furukawa, pp. 21 to 26, Sangyo Hochi Center, 1970 (in Japanese).

*Primary Examiner*—B. R. Fuller
*Attorney, Agent, or Firm*—Cushman, Darby & Cushman

[57] ABSTRACT

An active silencer provided in a pipe which has one end reaching the noise source and the other end open, the active silencer being provided with a sound generating means which is provided at the sidewall of the pipe facing inside the pipe, a sound collecting means which is provided outside the pipe close to the other end and which detects noise dissipated from the pipe opening, a phase leading means which outputs a lead phase output signal which is advanced from the phase of an output signal of the sound collecting means by a phase corresponding to a predetermined time determined by the distance between the sound generating means and the sound collecting means; and a drive means which outputs a signal constituting the lead phase output signla inverted in phase as a drive signal for the sound generating means, the predetermined time $\tau$ being set so that $\tau = L/C$, wherein the distance between the sound generating means and the sound collecting means is L and the speed of sound is C.

14 Claims, 7 Drawing Sheets

| Fig. 4A | Fig. 4B | Fig. 4C |

ACTIVE SILENCER

BACKGROUND OF THE INVENTION

1. Field of the Invention

The present invention relates to an active silencer, and more particularly, to an active silencer useful for the prevention of noise in air ducts, intake and exhaust pipes of automobile engines, etc.

2. Description of the Related Art

Active silencers cancel out noise by the provision of sound sources for silencing and by outputting from the sound sources sound having a phase opposite to the noise. Conventional resonance type silencers have been large in size due to the long wavelengths of the low frequency sound, but the above-mentioned active silencers are free from restrictions by the wavelength of the noise and therefore can effectively silence low frequency sound with a compact shape. They have therefore come into use as suitable for automobile silencers where installation space is difficult to secure. These silencers usually use speakers for the above-mentioned sound sources and use microphones for the sound collection means for detection of the noise waveform.

When such an active silencer is provided in a pipe like an intake or exhaust pipe of an automobile engine, where one end is connected to the sound source, i.e., the engine, and the other end is open, there is the problem that even if a microphone is installed in the pipe, it is difficult to accurately detect the waveform of the noise due to the phenomenon of noise reflection at the open end of the pipe.

SUMMARY OF THE INVENTION

The present invention, in consideration of the above problem, has as its object the provision of an active silencer which can be installed in an intake or exhaust pipe etc. where reflection occurs at the open end and can reduce noise effectively. The present invention also offers a large degree of freedom in the position of installation of the above-mentioned sound collection means and the above-mentioned silencing sound source.

also, another object, the present invention provides an active silencer which can reduce noise passing through the pipe from the noise source by a relatively simple construction in which the sound collecting means is provided at a position further away from the noise source than the sound generating means and a feedback control is carried out by using a phase locked loop.

To achieve the above objects, the silencer of the present invention is provided with a sound wave generating means (for example, a speaker) on the sidewall of the pipe facing inside the pipe and is provided with a sound collecting means (for example, a microphone) outside the pipe facing the pipe opening for detecting the noise. The distance between the above-mentioned speaker and microphone is L. The output signal of the above-mentioned microphone is input to a phase leading means, whereupon the phase leading means advances the phase of the above-mentioned output signal by exactly a phase corresponding to a predetermined time and outputs the result as a lead phase output signal. The lead phase output signal is input to a drive means and is inverted in phase. The inverted signal is then supplied to the above-mentioned speaker as a drive signal. Note that the above-mentioned predetermined time $\tau$ is set by the following equation:

$$\tau = L/C$$

where, C is the speed of sound.

Here, the lead phase output signal, which comprises the output signal of the microphone advanced by exactly a phase corresponding to the above predetermined time, matches in phase the noise which passes through the portion of the pipe where the speaker is installed. Therefore, by using a signal inverted in phase from the lead phase output signal as the drive signal of the speaker, the sound generated from the speaker can effectively cancel out the noise.

Therefore, according to the silencer of the present invention, provision is made of a microphone outside of the pipe so as to enable accurate detection of the waveform of the noise without influence of noise reflected at the pipe opening, whereby the noise transmitted and dissipated in the pipe can be effectively eliminated. Further, according to the silencer of the present invention, the phase is electrically advanced by exactly a phase corresponding to the distance L between the microphone and the speaker, so it is possible to arbitrarily set the distance L and thus to increase the degree of freedom of the position of installation of the microphone and speaker.

BRIEF DESCRIPTION OF THE DRAWINGS

FIG. 4 is depicted to include FIGS. 4A–4C wherein

DESCRIPTION OF THE PREFERRED EMBODIMENTS

Figure 1:
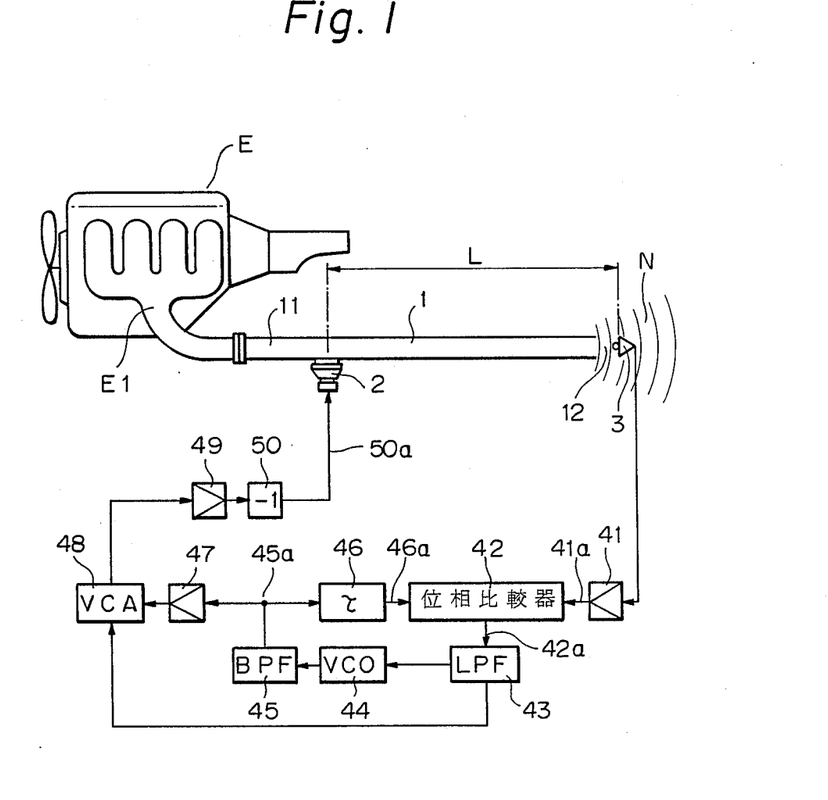
FIG. 1 is a block diagram showing the constitution of an active silencer according to an embodiment of the present invention.

In FIG. 1, one end 11 of an intake pipe 1 is connected to an intake manifold E1 of an engine E and the other end 12 of the intake pipe 1 is open. Along with the actuation of the intake valve (not shown) during the engine operation, pressure fluctuations occur in the intake manifold E1, which pressure fluctuations are propagated inside the intake pipe 1. Part is reflected at the open end 12 and the rest is dissipated as noise N from the above-mentioned open end 12. A speaker 2 is provided in the intake pipe 1 midway on the pipe wall, and a microphone 3 is provided outside the intake pipe 1 near the open end 12 facing the open end. The distance between the speaker 2 and the microphone 3 is L.

Figure 2:
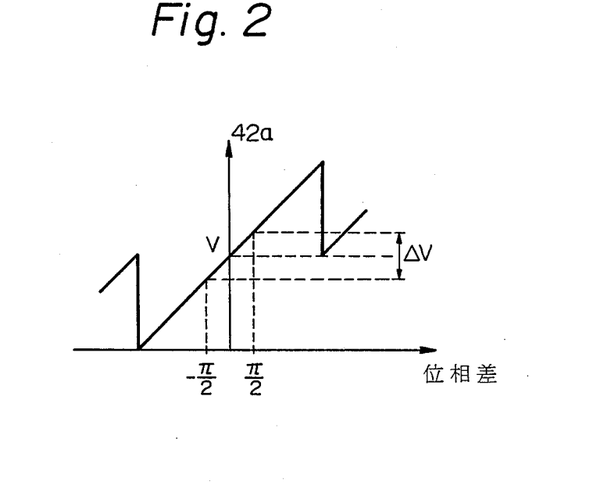
FIG. 2 is a graph showing the output characteristics of a phase comparator shown in FIG. 1.

The electrical circuit of the silencer comprises a preamplifier 41, a phase comparator 42, a low pass filter (LPF) 43, a voltage controlled oscillator (VCO) 44, a band pass filter (BPF) 45, an analog delay element 46 using, for example, a BBD (Bucket-Brigade Device), a signal use amplifier 47, a voltage controlled amplifier (VCA) 48, a power amplifier 49, and a phase inverter 50. Among these, the phase comparator 42, the LPF 43, the VCO 44, the BPF 45, and the delay element 46 constitute a phase feedback circuit, i.e., a PLL loop (phase locked loop). That is, the above-mentioned comparator 42 receives as input an output signal 41a of the preamplifier 41 and an output signal 46a of the delay element 46 and generates an output signal 42a in accordance with the phase difference therebetween. In this embodiment, as shown in FIG. 2, a reference voltage V is issued when the phase difference is zero, and the voltage of the above signal 42a is changed by $\Delta V$ about the reference voltage V when the phase difference changes from $-\pi/2$ to $\pi/2$. The VCO 44 receives as input the signal 42a, from which the noise component has been eliminated by the LPF 43, and outputs an oscillating signal which changes in frequency in accordance with the change in voltage $\Delta V$.

The oscillating signal is supplied to the amplifier 47 as a lead phase output signal 45a after passing through the BPF 45. The signal also is input into the delay element 46. The delay time of the delay element 46 is made the time required for propagation of the sound waves over the above-mentioned distance L and is shown by the following equation, wherein the speed of sound is represented by C:

$$\tau = L/C$$

Therefore, the signal 46a delayed by the time $\tau$ is input into the phase comparator 42, as mentioned above. Due to the phase feedback circuit, the phase of the above-mentioned signal 46a is controlled to match the phase of the signal 41a at all times, and the lead phase output signal 45a is advanced by a phase corresponding to the time $\tau$ from the signal 41a. Therefore, the signal 45a matches the phase of the waveform of the noise which passes through the portion of the intake pipe 1 where the speaker 2 is installed.

Thus, if the above-mentioned lead phase output signal 45a passes through the amplifiers 47 and 49 and is inverted in phase by 180 degrees by the phase inverter 50 and the resultant signal is supplied to the speaker 2 as a speaker drive signal 50a, the noise passing through the intake pipe 1 will be cancelled out by the sound output from the speaker 2.

Figure 3:
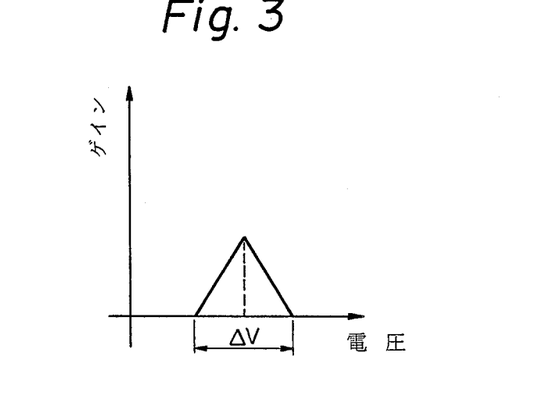
FIG. 3 is a graph showing the gain characteristics of a voltage controlled amplifier shown in FIG. 1.

In this connection, the level of the noise detected by the microphone 3 is smallest when the phase difference between the signal 41a and the signal 46a is zero. Therefore, in this embodiment, the VCA 48 is provided and use is made of the output signal 42a of the phase comparator 42 as a gain control signal of the VCA 48. That is, the gain of the VCA 48 is largest when the above-mentioned phase difference is zero, as shown in FIG. 3. By this, the phase feedback circuit operates so that the gain of the VCA 48 becomes maximum and enables elimination of the noise.

Figure 4:
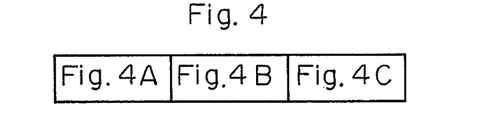
Figure 4A:
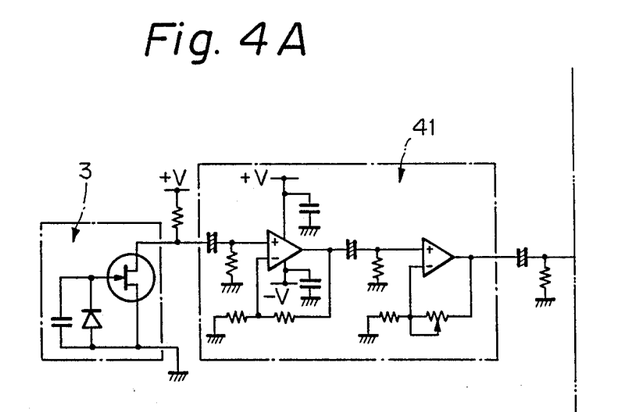
FIGS. 4A–4C are circuit diagrams showing an example of specific circuits of parts in the embodiment shown in FIG. 1.
Figure 4B:
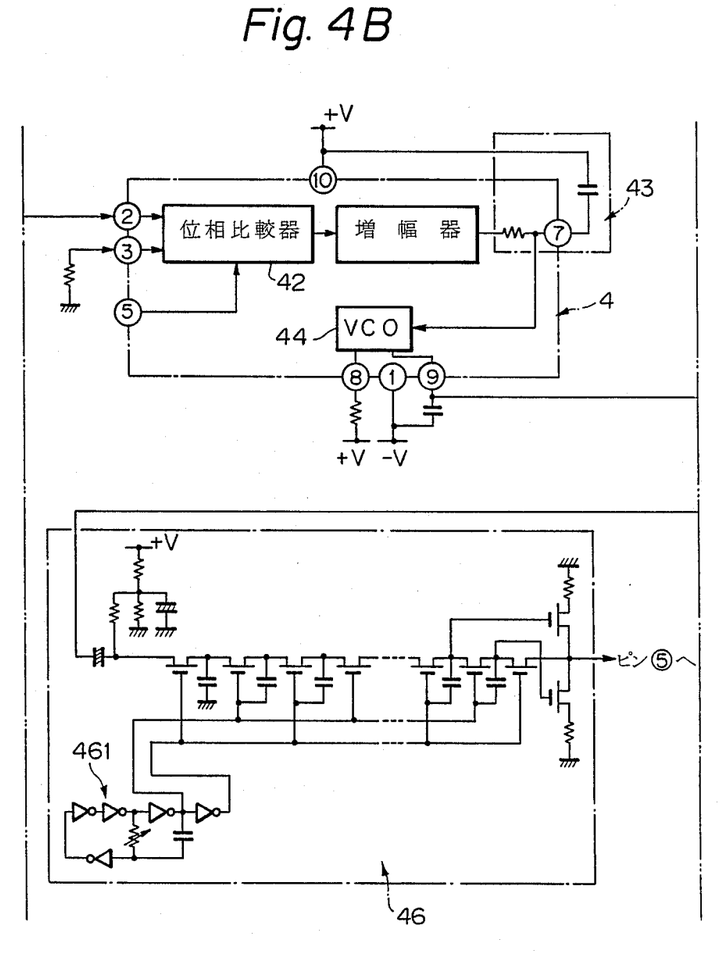
Figure 4C:
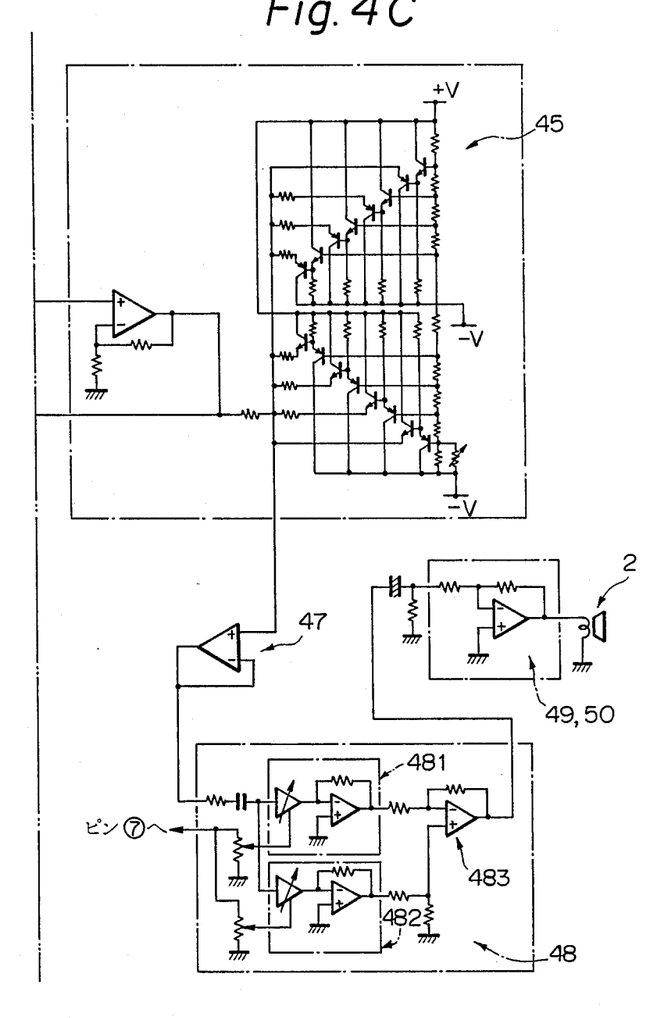

FIGS. 4A–4C show an example of specific circuits of parts of the embodiment shown in FIG. 1. The output signal of the condenser microphone 3 is amplified by the preamplifier 41 and the output signal of the amplifier 41 is input to the phase comparator 42. The phase comparator 42 and the voltage controlled oscillator (VCO) 44 may, for example, be comprised as a single integrated circuit. For example, these two circuits are built in the NE 565 of Signetics Co. In FIG. 4B, reference numeral 4 denotes the chip of the integrated circuit. The output signal of the above-mentioned amplifier 41 is input to the pin ② provided on the chip 4.

The output signal output from the phase comparator 42 is input through the amplifier and low pass filter 43 to the voltage controlled oscillator 44. Note that the low pass filter 43 is constituted by a capacitor provided outside the chip 4. The output signal of the voltage controlled oscillator 44 is taken from the pin ⑨ of the chip 4 and input to the band pass filter 45. The band pass filter 45 is constituted by a sine converter which converts the sawtooth wave output from the voltage controlled oscillator 44 to a sine wave of the same frequency. The sine converter is constituted by several NPN transistors and PNP transistors which receive different bias voltages. By this, the higher harmonic component in the sawtooth wave output is absorbed and conversion is made to a sine wave of the same frequency. Note that conversion of the sawtooth wave to a sine wave enables suppression of the higher harmonic component in the sawtooth wave which would drive the speaker at a high frequency.

In this way, the signal passing through the band pass filter is input through the amplifier 47 to the voltage controlled amplifier 48 and also input to the delay element 46. As the delay element 46, use is made of an audio device BBD (Bucket Brigade Device) (for example, the MN 3200 series made by Matsushita Electric Industrial Co., Ltd.) comprised of an MOS type FET (field effect transistor) and capacitor connected in cascade. The output signal of the delay element 46 is input through the pin ⑤ of the chip 4 to the phase comparator 42, whereby the above-mentioned phase feedback circuit, i.e., the PLL loop (phase locked loop) is formed. Note that the delay time $\tau$ of the delay element 46 is adjusted in consideration of the distance L between the microphone 3 and the speaker 2 and the delay in the phase feedback circuit by changing the frequency of a clock generator 461.

The voltage controlled amplifier 48 is comprised by two voltage controlled amplifiers 481 and 482 (for example, VCA 101A made by Tokyo Musen). The gain characteristics shown in FIG. 3 are obtained by differential amplification of the output signals of the amplifiers 481 and 482 by a differential amplifier 483. Note that the gain control signal for the amplifiers 481 and 482 is supplied from the pin ⑦ of the chip 4. The output signal of the voltage controlled amplifier 48 is supplied via the amplifier 49 and the phase inverter 50 to speaker 2.

Figure 5:
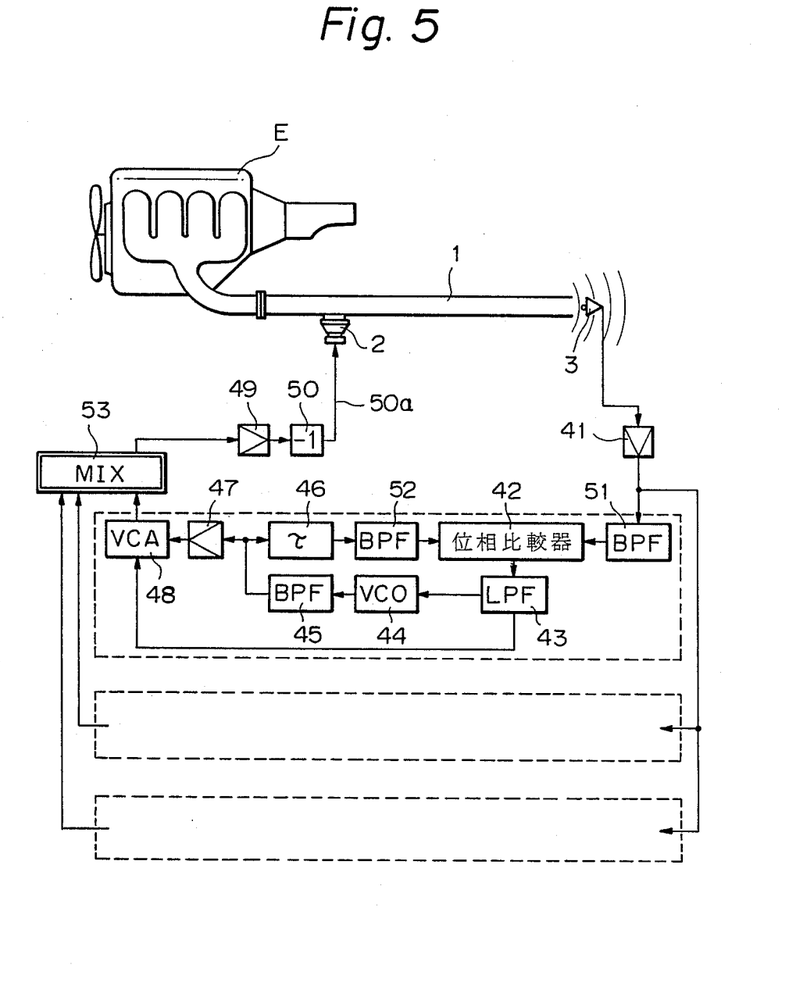
FIG. 5 is a block diagram showing the constitution of an active silencer according to another embodiment of the present invention.

The above embodiment covered noise of a single frequency, but by the constitution shown in FIG. 5, it is possible to effectively eliminate a wide band of noise. That is, FIG. 5 shows another embodiment of the present invention, wherein the electrical circuit enclosed by broken lines is provided, in addition to the circuits provided for the embodiment shown in FIG. 1, with band pass filters (BPF) 51 and 52 which take in only signals of predetermined frequency ranges. In this connection, there are further provided a plurality of circuits, enclosed by the broken lines, having BPFs 51 and 52 set for passage of respective, differing frequency ranges. The output signals of these plurality of circuits are input to a mixer (MIX) 53 and added in the mixer 53. Next, the phase of the added signal is inverted, and the inverted signal is used as the speaker drive signal 50a.

Figure 6:
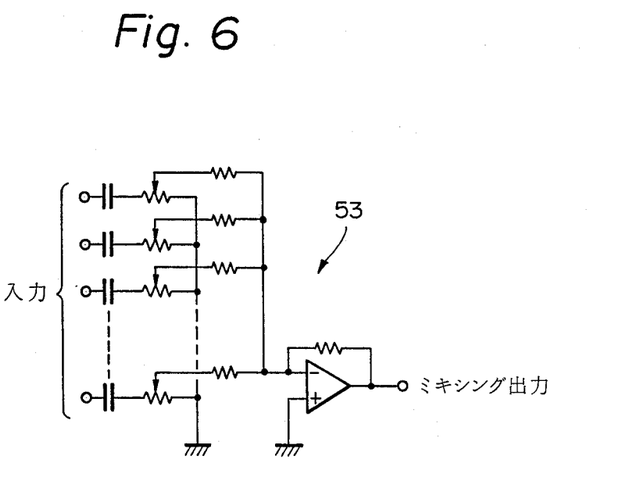
FIG. 6 is a circuit diagram showing an example of a specific circuit of a mixer shown in FIG. 5.

FIG. 6 is a circuit diagram showing a specific example of the mixer 53. The output signals from the VCAs 48 each provided in the plurality of circuits are input to the mixer 53. Each of the input signals is voltage divided through the corresponding capacitor, then added. The added signal is output as the mixing output.

We claim:

1. An active silencer provided at a pipe which has one end reaching a noise source and another end open, said active silencer comprising:
   means for generating a sound into said pipe so that a noise passing through said pipe from said noise source is reduced;
   means for collecting the sound dissipated from the open end of the pipe, said sound collecting means being provided outside the pipe close to said another open end and away from said sound generating means;
   means connected to said sound collecting means for generating a lead phase output signal by leading a phase of an output signal of said sound collecting means by a phase substantially corresponding to a predetermined time $\tau$, said predetermined time $\tau$ being set so that $\tau = L/C$, wherein L is a distance between said sound generating means and said sound collecting means and C is the speed of sound; and
   means connected to said phase leading means for outputting a drive signal which is an inverted signal of said lead phase output signal and for driving said sound generating means by said drive signal.

2. An active silencer according to claim 1, wherein use is made of a speaker as said sound generating means and use is made of a microphone as said sound collecting means.

3. At active silencer according to claim 1, wherein said phase leading means is provided with a phase comparison circuit, a voltage controlled oscillation circuit which outputs an oscillating signal of a frequency proportional to the input voltage, and a delay circuit with a delay time set to said predetermined time, wherein part of said oscillating signal is input to said delay circuit, an output signal of said sound collecting means and an output signal of said delay circuit are input to said phase comparison circuit, and an output of said phase comparison circuit is input to said voltage controlled oscillation circuit, whereby said oscillating signal is used as said lead phase output signal.

4. An active silencer according to claim 3, wherein said phase comparison circuit issues an output signal in accordance with a phase difference detected by said phase comparison circuit.

5. An active silencer according to claim 4, wherein said phase comparison circuit issues a predetermined reference voltage when said detected phase difference is zero and issues a voltage which changes over a predetermined voltage range about said reference voltage when said detected phase difference changes from $-\pi/2$ to $\pi/2$.

6. An active silencer according to claim 3, wherein a low pass filter is connected between said phase comparison circuit and said voltage controlled oscillation circuit.

7. An active silencer according to claim 3, wherein a band pass filter is connected between said voltage controlled oscillation circuit and said delay circuit.

8. An active silencer according to claim 7, wherein said band pass filter is constituted by converter means for converting a sawtooth wave output of said voltage controlled oscillation circuit into a sine wave of the same frequency.

9. An active silencer according to claim 3, wherein said drive signal outputting means is provided with a voltage controlled amplification circuit, whose gain changes in accordances with the input voltage, and a phase inversion circuit, said voltage controlled amplification circuit amplifying said lead phase output signal input thereto with a gain corresponding to the output of said phase comparison circuit and supplying said amplified output signal to said phase inversion circuit.

10. An active silencer according to claim 9, wherein said voltage controlled amplification circuit amplifies said lead phase output signal with a maximum gain when a phase difference detected by said phase comparison circuit is zero.

11. An active silencer according to claim 9, further provided with a mixer which adds the output signals of a plurality of voltage controlled amplification circuits receiving as input lead phase output signals of respective, differing frequency ranges, the output signal of said mixer being supplied to said phase inversion circuit.

12. An active silencer according to claim 11, wherein a plurality of said phase leading means is provided, said phase leading means receiving as input from said sound collecting means only the output signals of respective, predetermined frequency ranges, each of the lead phase output signals output from said plurality of phase leading means being input into each of said plurality of voltage controlled amplification circuits.

13. An active silencer according to claim 12, further provided with a band pass filter which takes into a predetermined phase leading means only output signals of said predetermined frequency range.

14. An active silencer provided at a pipe which has one end reaching a noise source and another end reaching the atmosphere, said active silencer comprising:
   means for generating a sound into said pipe so that a noise passing through said pipe from said noise source is reduced;
   means for collecting the sound passing through said pipe from said sound generating means, said sound collecting means being provided at a position further away from said noise source than said sound generating means;
   means connected to said sound collecting means for generating a lead phase output signal by leading a phase of an output signal of said sound collecting means by a phase substantially corresponding to a time determined by a distance between said sound generating means and sound collecting means, comprising:
   means for comparing a phase of said output signal of said sound collecting means with that of a delay signal produced by delaying said lead phase output signal,
   means for oscillating said lead phase output signal according to an output signal of said phase comparing means, a frequency of said lead phase output signal being proportional to said output signal of said phase comparing means, and
   means for delaying said lead phase output signal, wherein said phase comparing means, said oscillating means, and said delay means constitute a phase locked loop; and
   means responsive to said lead phase output signal for outputting a drive signal which is an inverted signal of said lead phase output signal and for driving said sound generating means by said drive signal.

* * * * *